L. B. PHELPS.
AUTOMOBILE SIGNAL.
APPLICATION FILED DEC. 1, 1917.
1,278,741.
Patented Sept. 10, 1918.
2 SHEETS—SHEET 1.
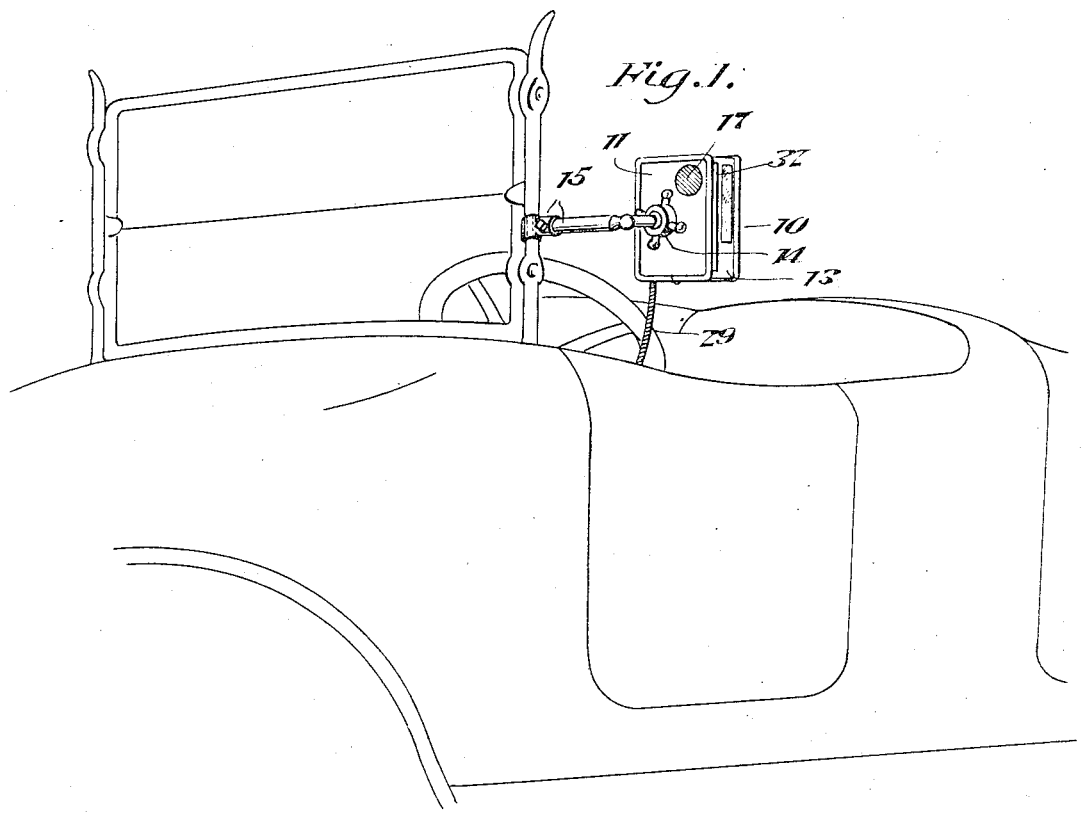
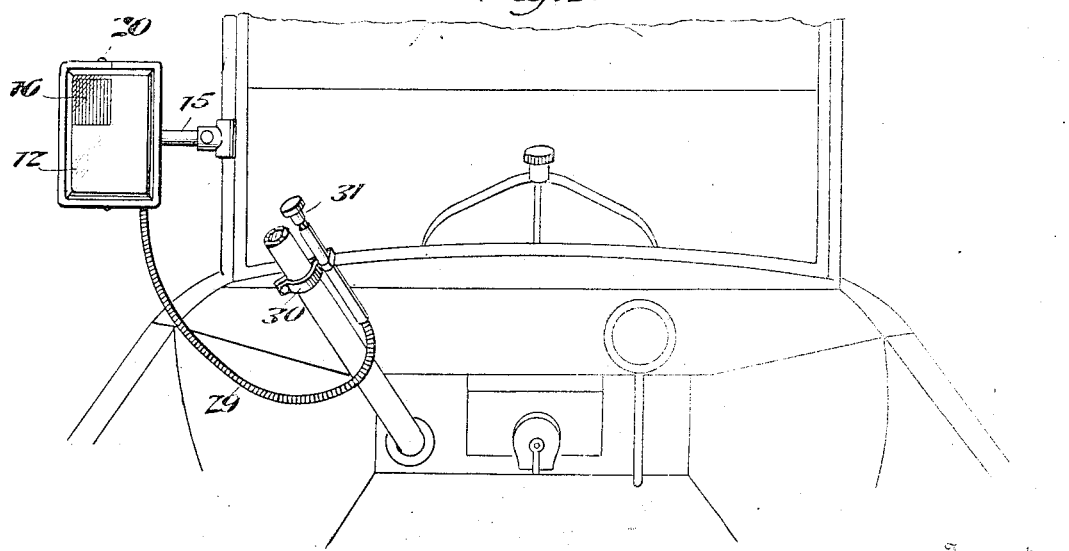
Inventor
L. B. Phelps
By Victor J. Evans
Attorney
Witnesses L. B. PHELPS.
AUTOMOBILE SIGNAL.
APPLICATION FILED DEC. 1, 1917.
1,278,741.
Patented Sept. 10, 1918.
2 SHEETS—SHEET 2.
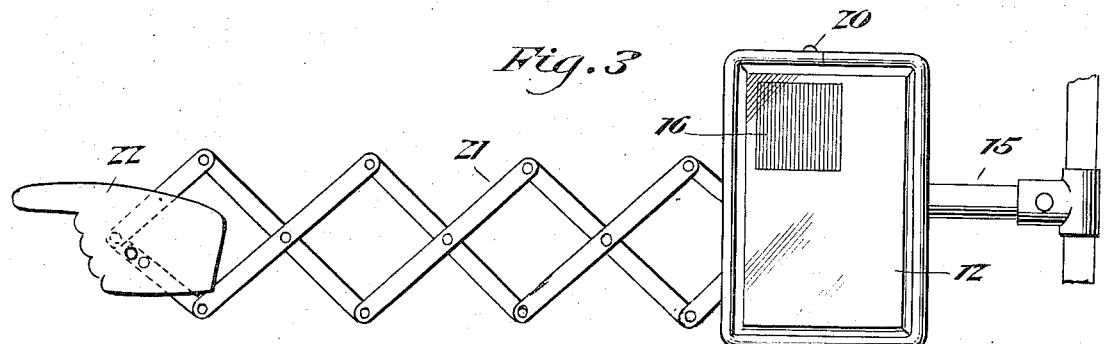
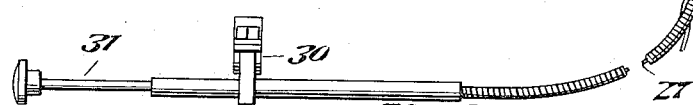
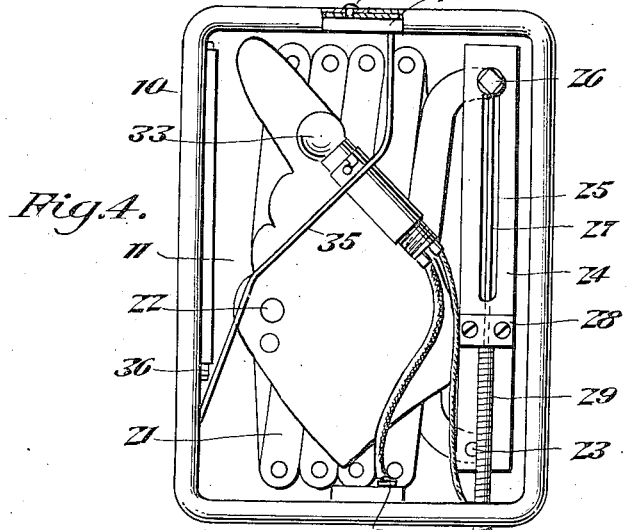
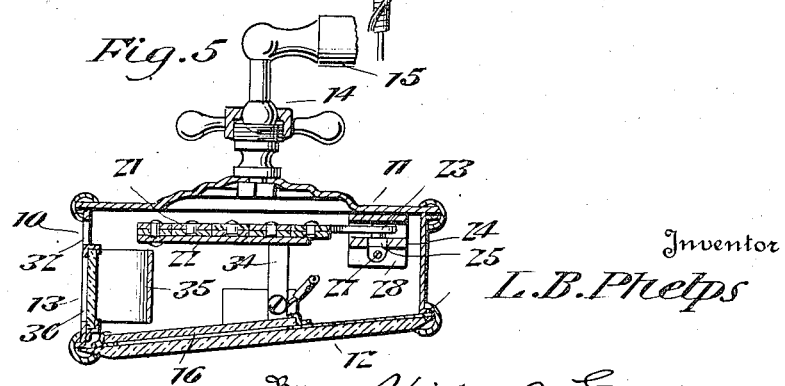
Inventor
L. B. Phelps
By Victor J. Evans
Attorney
Witnesses

UNITED STATES PATENT OFFICE.

LOUIS B. PHELPS, OF CARTHAGE, NEW YORK.

AUTOMOBILE-SIGNAL.

1,278,741.

Specification of Letters Patent. Patented Sept. 10, 1918.

Application filed December 1, 1917. Serial No. 204,931.

*To all whom it may concern:*

Be it known that I, LOUIS B. PHELPS, a citizen of the United States, residing at Carthage, in the county of Jefferson and State of New York, have invented new and useful Improvements in Automobile-Signals, of which the following is a specification.

This invention relates to signals and aims to provide means for indicating the proposed direction of travel of a motor vehicle.

The primary object of the invention is to provide a signal which is neat and attractive in appearance, readily distinguishable, simple in construction and positive in operation and one that may be positioned so as to be visible to the operator of the vehicle.

The invention also aims to provide a signal which is adapted to be secured to the wind shield of the vehicle and constructed so as to combine a mirror therewith, thereby adding to the usefulness and attractiveness of the signal.

For the accomplishment of the above purposes, the invention includes a casing connected to a bracket by means of a universal joint and adapted to be secured to the vehicle wind shield, the casing providing a housing for a toggle arm which carries at one end a hand or pointer, the said arm being operable through an opening in the side of the housing, a guide located within the latter and providing means for controlling the operation of the arm and also guiding the arm actuating means, the latter being in the form of a flexible rod having one of its ends located within convenient reach of the driver. The casing further contains a suitable source of light, which is adapted to illuminate a red glass at the rear of the casing and a green glass at the front thereof, while a plain glass at the outer side and adjacent the signal arm provides for the illumination of the latter. The light is preferably in the form of an electric bulb and when the signal is operated the light circuit is completed through the medium of a contact of the arm with a spring finger.

In the drawings:

Figure 1 is a perspective view of the front portion of a motor vehicle equipped with a signal embodying the present invention;

Fig. 2 is a view looking toward the rear side of the wind shield with the signal connected thereto and illustrating the position of the operating element upon the steering column, the signal being shown in an inoperative position;

Fig. 3 is a view similar to Fig. 2 with the signal arm extended;

Fig. 4 is an elevation of the signal with the rear plate or mirror removed and looking at the interior of the signal casing; and Fig. 5 is a transverse sectional view through the signal casing.

In the drawings there is illustrated a casing 10, which includes front and rear walls 11 and 12 respectively, and side walls, one of which is designated at 13. The casing in which the signal is mounted is adapted to be secured to the side of the wind shield of a vehicle and for this purpose, the front wall 11 is connected by means of a universal joint 14 with one end of a bracket arm 15, the opposite end of this arm carrying suitable means by which it may be secured to the frame of the wind shield. The length of the bracket arm 15 is such as to position the casing so that it will be visible from both the front and rear ends of the vehicle.

The rear face 12 of the casing is in the form of a mirror and is disposed at an angle with respect to the front face or wall, so that the said casing may be positioned substantially at right angles to the length of the vehicle and the mirror still be in the proper position for the driver's use. Positioned within the rear wall 12 is a lens 16, preferably of red glass, so that a source of light within the casing will be reflected through this glass toward the rear of the vehicle, taking the place of the usual tail light. The front wall 11 has positioned therein a preferably green lens 17 which is visible from the front of the vehicle. Both the front and rear walls are secured to the casing by means of a channeled frame of resilient material, which is swung over the edges of these walls and over flanges 19 formed around the front and rear edges of the casing, the frame being secured in position by a screw or other suitable fastening device 20 which connects the free ends of the frame.

The signal arm 21 is in the form of a toggle member and carries at one end a pointer or hand 22. The opposite end of the arm or toggle member has one of its links pivotally secured within the casing as shown at 23. This pivot is located within the lower end of the guide 24, which is slotted as at 25 and slidably mounted within this slot is one end of a toggle link as shown at 26. Connected to the element 26 is one end of a flexible rod 27, this rod being guided in a block 28 secured upon the guide 24 and entering a flexible tube 29. One end of this tube is secured within the block 28 and the opposite end of the steering column of the motor vehicle, a clamp 30 being utilized for the latter purpose. The rod 27 extends through this end of the flexible guiding tube 29 and is provided with an operating handle or button 31 positioned within convenient use of the driver.

By pulling outward upon the button 31, the inner ends of the toggle member or signal arm will be contracted and the arm projected through a slot 32 provided in the side wall 13 of the casing, a reverse movement of the rod serving to retract the arm within the casing.

Positioned within the casing is a suitable source of light, preferably in the form of an electric bulb 33, the circuit in which the bulb is included being normally open and adapted to be closed when the arm is extended, through the contact of the said arm with a spring finger 34 located within the casing. The bulb 33 is mounted within a socket carried by a bracket 35 and is so positioned that its rays will illuminate both of the lenses 16 and 17. In addition the side wall 13 is provided with a lens 36 of clear glass, so that the source of light will illuminate the signal arm, when the latter is extended. If desired the bulb 32 may be included in the usual lighting system, so that it will be illuminated when the lighting switch is manipulated to turn on the usual vehicle lights. By arranging the rear wall 12 of the casing at a suitable angle with respect to the front wall, the mirror will be positioned conveniently for the driver and at the same time the signal casing will be in position to project the arm 21 substantially at right angles to the length of the vehicle when operated.

Various changes may be made in the form, proportion and minor details of construction and the right is reserved to make such changes as will properly fall within the scope of the claim hereto appended.

Having described the invention, what is claimed is:—

A vehicle signal comprising in combination a vertically disposed closed casing including a side wall provided with a vertically disposed slot near one edge and front and rear walls each provided with a colored lens, a vertically disposed guide member secured within said casing, said member comprising spaced parallel bars, one of said bars having a longitudinally disposed slot therein, a toggle member normally housed within said casing for passage through said slot, a signal carried by the toggle member, said signal being visible through said colored lens, one end of one link of said toggle member being permanently secured to one end of the guide member, an element mounted for movement within the slot of the guide member, said element being secured to one end of the opposite link of the toggle member and a flexible rod connected to said element, and a flexible guiding tube for the rod, whereby the toggle member may be annularly operated to project a signal through the slot in the casing and to return the signal within the casing.

In testimony whereof I affix my signature.

LOUIS B. PHELPS.